UNITED STATES PATENT OFFICE.

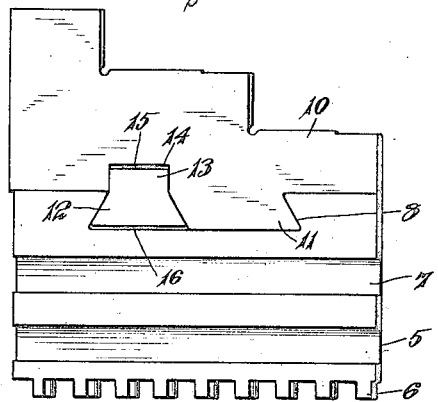
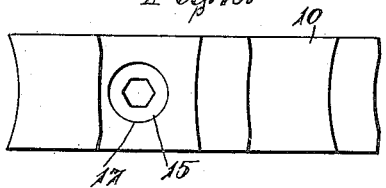
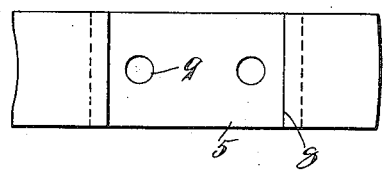
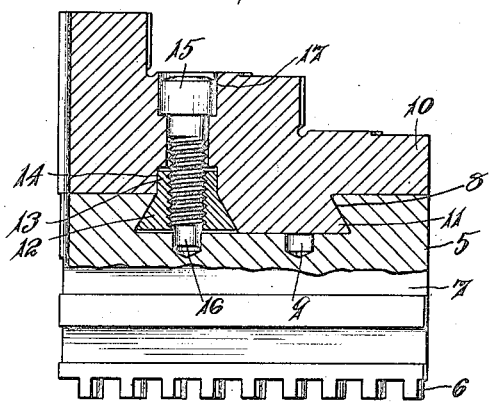

HARRY E. SLOAN, OF HARTFORD, CONNECTICUT.

CHUCK-JAW.

1,372,726.　Specification of Letters Patent.　Patented Mar. 29, 1921.

Application filed May 29, 1918. Serial No. 237,182.

*To all whom it may concern:*

Be it known that I, HARRY E. SLOAN, a citizen of the United States, residing in Hartford, in the county of Hartford and State of Connecticut, have invented a new and Improved Chuck-Jaw, of which the following is a specification.

My invention relates more especially to that class of chuck jaws embodying two members, the inner or base member of which is provided with means for moving the jaw and the outer or gripping member of which is reversible on the base member, and an object of the invention, among others, is to provide means for rigidly securing the two members together.

One form of chuck jaw embodying my invention and in the construction and use of which the objects herein set out, as well as others, may be attained, is illustrated in the accompanying drawings, in which—

Figure 1 is a view in side elevation of a chuck jaw embodying my invention.

Fig. 2 is a top plan view of the same.

Fig. 3 is a top plan view of the base member of the jaw.

Fig. 4 is a view in vertical central section through the upper portion of my improved jaw.

The chuck jaw illustrated and described herein for the purpose of disclosure of my invention is of the kind used in scroll chucks and comprises a base member 5 having teeth 6 that are engaged by the scroll for the purpose of moving the jaw in a radial direction in the body of the chuck. Grooves 7 extending along opposite sides of the base member of the jaw engage ribs or edges of openings in the body of the chuck in a manner common to devices of this class.

A dove-tailed groove 8 is cut across the top or outer face of the base member and positioning holes 9 are formed in the bottom of this groove.

The outer or gripping member 10 of the jaw carries a dove-tail shaped projection that fits the groove 8, this dove-tail shaped projection comprising a section 11 integral with the member 10 and a wedging block 12 separately formed and also of dove-tailed shape in cross section and having a tenon 13 fitting a groove 14 in the under surface of the gripping member 10.

A clamp screw 15, extending through the gripping member 10, is threaded to fit the block 12 and is provided at its end with a positioning tip 16 formed to fit the positioning holes 9. The enlarged head of the screw fits a recess 17 in the top or outer face of the gripping member 10, and this head may have an angularly shaped hole to receive a wrench for the purpose of turning the screw.

It will be noted that in securing the gripping member 10 in place, either in the position shown in the drawings or in a position reversed thereto, the tip 16 of the clamp screw will enter a hole 9 to properly position the members, and then by a continued turning movement of the clamp screw the block 12 will be drawn upwardly until the sloping surfaces of its dove-tail shaped part are drawn tightly into contact with corresponding surfaces on the gripping member 10 and in the groove 8.

The block 12 is illustrated and has. been described herein as of dove-tailed shape in cross section and with a tenon thereon, but this shape of said block may be changed in various ways without departing from the spirit and intent of the invention.

In accordance with the provisions of the patent statutes, I have described the principles of operation of my invention, together with the chuck jaw which I now consider to represent the best embodiment thereof; but I desire to have it understood that the device shown is only illustrative and that the invention may be carried out by other means.

I claim—

1. A chuck jaw comprising a base member having a dove-tail shaped groove, a gripping member having a dove-tail shaped projection including a block having one side beveled to complete the dove-tailed shape of said projection, and means for drawing the block into position to wedge the two members together.

2. A chuck jaw comprising a base member having a dove-tail shaped groove, a gripping member having a mortise and a dove-tail shaped projection including a block having one side beveled to complete the dove-tailed shape of said projection, a tenon on said block to fit said mortise, and means for drawing said block into position to wedge the members together.

3. A chuck jaw comprising a base member having a dove-tail shaped groove, a gripping member having a projection with opposite sides sloping in the same direction, a block of dove-tailed shape to fit a sloping surface of said projection and a wall of said dove-tail shaped groove, and means for drawing the block into position to wedge the members together.

4. A chuck jaw comprising a base member having a dove-tail shaped groove, a gripping member having a projection with opposite sides sloping in the same direction, said gripping member also having a mortise, a block of dove-tail shape to fit a sloping surface on one side of said projection and one side of said dove-tail shaped groove, said block having a tenon to fit said mortise, and means for drawing the block into position to wedge the members together.

5. A chuck jaw comprising a base member having a dove-tail shaped groove therein, a gripping member having a dove-tail shaped projection including a block having one side beveled to complete the dove-tailed shape of said projection, and a screw extending through the gripping member and into said block to draw the latter into wedging contact with the gripping member and base member.

6. A chuck jaw comprising a base member having a dove-tail shaped groove, a gripping member having a dove-tail shaped projection including a block of dove-tailed shape, and a screw projecting through the gripping member and fitting said block to draw it into wedging action with the wall of said groove on one side and with said projection on the opposite side, said screw also having a positioning tip to fit positioning holes in the base member.

7. A chuck jaw comprising a base member and a griping member, one of said members having a dove-tail shaped groove and the other having a dove-tail shaped projection to fit said groove, said projection including a block forming one side thereof, and means for drawing the block into contact with the wall of said groove on one side and with said projection on the opposite side to wedge the two members together.

8. A chuck jaw comprising a base member and a gripping member, one of said members having a dove-tail shaped groove and the other having a projection with opposite sides sloping in the same direction, a block of dove-tail shape to fit a sloping surface of said projection and a wall of said groove, and means for drawing the block into contact with the wall of said groove on one side and with said projection on the opposite side to wedge the members together.

9. A chuck jaw comprising a base member and a gripping member, one of said members having a dove-tail shaped groove and the other of said members having a dove-tail shaped projection including a block of dove-tail shape, and a block actuating screw projecting through the gripping member and fitting said block to draw it into wedging action against the wall of said groove on one side and against the projection on its opposite side, said screw also having a positioning tip to fit positioning holes in the base member.

10. A chuck comprising a base member and a gripping member, one of said members having a dove-tail shaped groove and the other of said members having a dove-tail shaped projection to fit said groove, said projection including a block having one side in contact with said projection and the opposite side in contact with the wall of said groove, and means for drawing the block into wedged engagement on one side with the wall of said groove and on its other and opposite side with said projection.

11. A chuck comprising a base member having a dove-tail shaped groove and a gripping member having a dove-tail shaped projection to fit said groove, said projection including a wedging member adapted to press against the wall of said groove on one side and against said projection on its other and opposite side, and means for actuating said wedging member to draw it into wedged engagement with said groove on one side and with said projection on its other and opposite side.

HARRY E. SLOAN.